(12) United States Patent
Stroomer et al.

(10) Patent No.: US 9,383,986 B2
(45) Date of Patent: Jul. 5, 2016

(54) SAFE LOW COST WEB SERVICES SOFTWARE DEPLOYMENTS

(71) Applicant: Disney Enterprises, Inc., Burbank, CA (US)

(72) Inventors: Jeffrey Stroomer, Lafayette, CO (US); Philip Bryn James-Roxby, Longmont, CO (US); Sean A. Kelly, Boulder, CO (US); Raul E. Rangel, Golden, CO (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 315 days.

(21) Appl. No.: 13/920,592

(22) Filed: Jun. 18, 2013

(65) Prior Publication Data
US 2014/0372984 A1    Dec. 18, 2014

(51) Int. Cl.
*G06F 9/44* (2006.01)
*G06F 9/445* (2006.01)
*G06F 11/36* (2006.01)
*G06F 9/455* (2006.01)

(52) U.S. Cl.
CPC ............. *G06F 8/61* (2013.01); *G06F 9/45558* (2013.01); *G06F 11/3664* (2013.01); *G06F 2009/45562* (2013.01)

(58) Field of Classification Search
CPC ............. G06F 8/61; G06F 8/65; G06F 8/60; G06F 11/3672; G06F 11/1433; G06F 8/62; G06F 9/44505; G06F 9/4451
See application file for complete search history.

(56) References Cited

U.S. PATENT DOCUMENTS

| | | | |
|---|---|---|---|
| 7,594,219 B2 * | 9/2009 | Ramachandran | G06F 8/65 713/100 |
| 7,653,794 B2 | 1/2010 | Michael et al. | |
| 8,015,559 B2 | 9/2011 | Nakano et al. | |
| 8,037,180 B2 | 10/2011 | Smith et al. | |
| 8,117,613 B2 | 2/2012 | Uyeda | |
| 8,341,626 B1 | 12/2012 | Gardner et al. | |
| 8,863,085 B1 * | 10/2014 | Stahlberg | G06F 11/3668 717/124 |
| 2004/0205406 A1 * | 10/2004 | Kaliappan et al. | 714/31 |
| 2005/0022176 A1 * | 1/2005 | Ramachandran | G06F 8/65 717/170 |
| 2006/0184653 A1 | 8/2006 | van Riel | |
| 2007/0271560 A1 | 11/2007 | Wahlert et al. | |
| 2009/0133018 A1 | 5/2009 | Kaneki | |

(Continued)

OTHER PUBLICATIONS

Lian Yu et al.; Testing as a Service over Cloud; 2010 IEEE; pp. 181-188; <http://ieeexplore.ieee.org/stamp/stamp.jsp?tp=&arnumber=5569908>.*

(Continued)

*Primary Examiner* — Thuy Dao
*Assistant Examiner* — Cuong V Luu
(74) *Attorney, Agent, or Firm* — Patterson + Sheridan, LLP

(57) ABSTRACT

System, method, and computer program product to perform an operation, including installing a first service on a first virtual machine and a second service on a second virtual machine in a web services cluster, testing the first service on the first virtual machine and the second service on the second virtual machine to determine that the first and second services are stable, installing the first service and the second service on a third virtual machine in the web services cluster, causing at least a portion of traffic directed to the first service and the second service to be sent to the third virtual machine, testing the first service and the second service on the third virtual machine, and removing the first and second virtual machines from the web services cluster upon determining that the first service and the second service executing on the third virtual machine are stable.

21 Claims, 3 Drawing Sheets

(56) References Cited

U.S. PATENT DOCUMENTS

| | | | |
|---|---|---|---|
| 2009/0144704 A1* | 6/2009 | Niggemann | G06F 8/24 717/124 |
| 2009/0300092 A1* | 12/2009 | Corry et al. | 709/202 |
| 2009/0313620 A1 | 12/2009 | Sedukhin et al. | |
| 2010/0218177 A1* | 8/2010 | Miura | G06F 8/65 717/170 |
| 2010/0293537 A1* | 11/2010 | Broussard | G06F 8/68 717/170 |
| 2011/0167421 A1 | 7/2011 | Soundararajan et al. | |
| 2011/0173327 A1 | 7/2011 | Chen et al. | |
| 2011/0296383 A1* | 12/2011 | Pasternak | G06F 11/3688 717/124 |
| 2011/0302578 A1 | 12/2011 | Isci et al. | |
| 2012/0084607 A1* | 4/2012 | Lam et al. | 714/38.1 |
| 2012/0260247 A1 | 10/2012 | Huang et al. | |
| 2012/0272235 A1 | 10/2012 | Fahrig | |
| 2012/0272242 A1 | 10/2012 | Jeon et al. | |
| 2012/0304169 A1 | 11/2012 | Anderson et al. | |
| 2012/0324069 A1 | 12/2012 | Nori et al. | |
| 2013/0185715 A1* | 7/2013 | Dunning et al. | 718/1 |
| 2014/0026129 A1* | 1/2014 | Powell | G06F 8/67 717/170 |

OTHER PUBLICATIONS van Krsul et al.; VMPlants Providing and Managing Virtual Machine Execution Environments for Grid Computing; 2004 IEEE; 12 pages; <http://ieeexplore.ieee.org/stamp/stamp.jsp?tp=&arnumber=1392937>.*

William Voorsluys et al.; Cost of Virtual Machine Live Migration in Clouds: A Performance Evaluation; 2009 LNCS; pp. 254-265; <http://link.springer.com/chapter/10.1007/978-3-642-10665-1_23>.*

Radu Prodan et al.; A Survey and Taxonomy of Infrastructure as a Service and Web Hosting Cloud Providers; 2009 IEEE; pp. 17-25; <http://ieeexplore.ieee.org/stamp/stamp.jsp?tp=&arnumber=5353074>.*

Ian Foster; Globus Toolkit Version 4 Software for Service Oriented Systems; 2006 Springer; pp. 513-520; <http://link.springer.com/article/10.1007/s11390-006-0513-y>.*

Renzo Davoli; VDE Virtual Distributed Ethernet; 2005 IEEE; 8 pages; <http://ieeexplore.ieee.org/stamp/stamp.jsp?tp=&arnumber=1386197>.*

* cited by examiner

SAFE LOW COST WEB SERVICES SOFTWARE DEPLOYMENTS

BACKGROUND

1. Field of the Invention

Embodiments disclosed herein relate to the field of computer software. More specifically, embodiments disclosed herein relate to cluster consolidation in a web services cluster.

2. Description of the Related Art

Organizations use machine clusters to host web services. These clusters may include many machines that communicate with each other. Services are software, which evolves over time and may fail. Clusters typically handle live traffic, and changing the software providing a service from a cluster of servers often requires a "hot update," i.e., making the change while the cluster continues to handle requests. Virtual machines provide services, but by their nature, can be moved from one host to another. As such, some physical computing system can host different services. As with any software product, there are risks associated with changes, so much effort goes into minimizing the risk of updates. For example, two services running on the same machine (physical or virtual) may not be compatible. However, these efforts may lead to increased costs in hosting the services. There is therefore a need to reduce the risk of deploying new services to web clusters while keeping costs down in doing so.

SUMMARY

Embodiments disclosed herein provide a system, method, and computer program product to perform an operation, including installing a first service on a first virtual machine and a second service on a second virtual machine, the virtual machines configured to execute one or more services in a web services cluster, testing the first service on the first virtual machine and the second service on the second virtual machine to determine that the first and second services are stable, installing the first service and the second service on a third virtual machine configured to execute one or more services in the web services cluster, causing at least a portion of traffic directed to the first service and the second service to be sent to the third virtual machine, testing the first service and the second service on the third virtual machine, and removing the first and second virtual machines from the web services cluster upon determining that the first service and the second service executing on the third virtual machine are stable.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein improve safety and reduce costs when adding new software or updating existing software on a web services cluster by providing a "deployment" step and a "consolidation" step. In the deployment step, new/updated services are deployed onto freshly-allocated virtual machines (VMs), using a different VM for each service. In the consolidation step, services running on separate VMs are consolidated so they run on the same machine.

By employing freshly-allocated standalone VMs in the deployment step, safety is maximized. Using freshly-allocated machines guarantees the environment is stable, and running one service per machine guarantees that problems with one service cannot affect other "innocent bystander" services. However, since infrastructure providers typically charge by the number of VMs employed, this approach can be expensive. The consolidation step reduces the infrastructure cost by shifting services that had been running on separate VMs so that they are co-located on the same VM. The consolidation step is typically performed only after a "burn-in" period, during which the correct functioning of the services to be consolidated has been verified.

To illustrate the technique, if a web services cluster already contains a VM running a "voting" service, a new service called "achievements" may need to be added. In the deployment step, the system (or a user) allocates a new VM and installs the achievements service on the new VM. The new VM is then added to the cluster. The voting and achievements services are unlikely to interfere with one another as they run on separate VMs. After successful completion of a predefined burn-in period to verify that the achievements service is stable, the consolidation step is performed. In the consolidation step, the system (or the user) allocates yet another fresh new VM and installs both voting and achievements on it. The new VM having both consolidated services is then added to the cluster. The system (or the user) may then update the routing tables for the web services cluster to cause traffic for the voting and achievements services to the new, consolidated, VM. Following a second burn-in period, the original machines that were individually hosting voting and achievements are deallocated.

Both steps of the process may be performed by manually or may be automated. If the process is automated, it may be performed as a background task, running hourly/nightly/weekly/off-peak. Running the process as an automated background task means that the cost of operating the cluster can be kept low without the need for human intervention.

Although embodiments disclosed herein are described using virtual machines as a reference example, the techniques described herein apply equally to other types of machines, including physical computing machines. The use of virtual machines as a reference example should not be considered limiting.

Figure 1A:
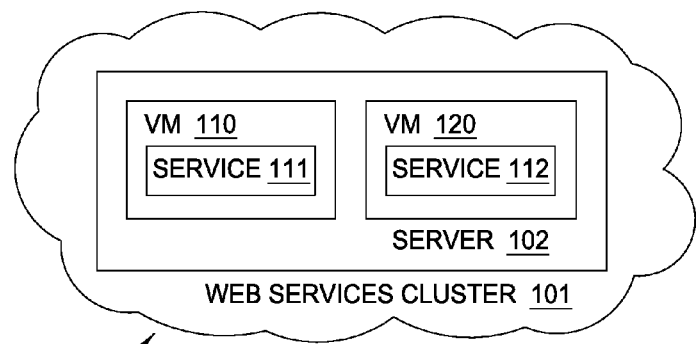
FIGS. 1A-1C are schematics illustrating techniques for safe, low cost web services software deployments, according to one embodiment.

FIG. 1A is a schematic 100 illustrating techniques for safe, low cost web services software deployments, according to one embodiment. As shown, a web services cluster 101 includes a server 102 which hosts virtual machines 110 and 120. Each of the virtual machines 110 and 120 host one web service. In this example, service 111 is hosted on virtual machine 110 and service 112 is hosted on virtual machine 120. The services 111 and 112 may be different versions of the same web service or different web services. For example, service 111 may be version 1.2.3 of a voting service, while service 112 is version 1.2.4 of the voting service. The voting service may be used to allow users to vote in polls, surveys, and the like. In another example, service 111 may be version 1.2.4 of the voting service, while service 112 is version 2.3.4 of an achievements service, which may track user awards and other accomplishments.

A system administrator may separate services 111 and 112 on different virtual machines for any number of reasons. For example, if the services are different web services, the system administrator may wish to isolate a new service, such as service 112, from an existing service 111, such that any potential flaws or bugs in the software of service 112 do not negatively impact service 111. Likewise, if the service 112 is a newer version of the service 111, an administrator may isolate the new version to ensure that it works properly, without negatively impacting other "innocent bystander" services executing on the same virtual machine. After a predefined period of time, the system administrator may determine that the service 112 is stable. Because service providers tend to charge by the number of virtual machines hosted in the web services cluster 101, it may be advantageous to reduce the number of virtual machines by co-locating one or more services, such as service 111 and 112 on a common virtual machine host, provided the administrator has confidence that the services can execute in such a manner safely.

Figure 1B:
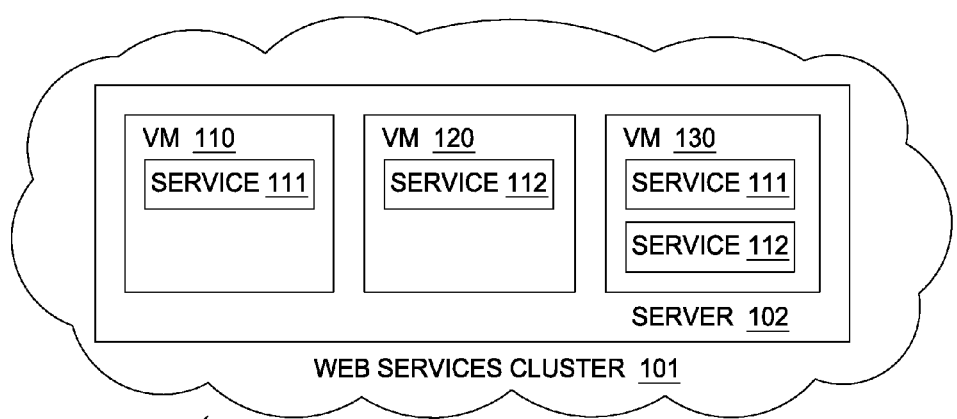

FIG. 1B is a schematic 100 illustrating techniques for safe, low cost web services software deployments, according to one embodiment. As shown, a virtual machine 130 has been deployed on the server 102 in the web services cluster 101. The virtual machine 130 hosts both service 111 and service 112. The services 111, 112 may have been installed on the virtual machine 130 by an agent configured to query virtual machines 110 and 120, or some other designated component of server 102, to determine what services were executing thereon. The virtual machines 110 and 120 may respond to this request by indicating the name of the services. For example, virtual machine 110 may respond by stating that service 111 is one version of the voting service and virtual machine 120 may respond by stating that service 112 is a version of the achievements service. In one embodiment, the agent may use the service names, possibly augmented with version specifiers to locate installers for the services in a repository of installers. Once the necessary information is received, the agent may retrieve the installer packages and install the services 111 and 112 on the virtual machine 130. In addition, the agent may modify cluster traffic distribution tables, which in one embodiment may be implemented in a reverse proxy, to direct some (or all) requests for services 111, 112 to the instantiations of the services 111-112 on the virtual machine 130. After some period of "burn-in" time, which may be any predefined period of time, such as 1, 5, or 10 days, the agent, or an administrator may determine that the services 111, 112 can be safely co-located. During this "burn-in" time, a software agent, or human administrator, may determine that the services 111, 112 can execute on the virtual machine 130 without conflict. Once the agent or administrator determines that the services 111, 112 can safely coexist on the same virtual machine, the administrator or the agent may retire virtual machines 110 and 120 to save costs.

Figure 1C:
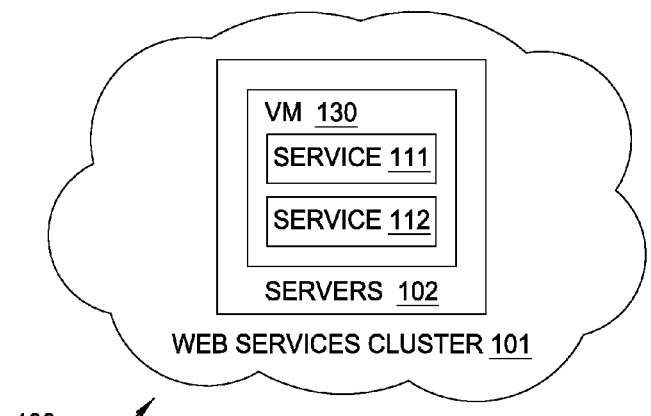

FIG. 1C is a schematic 100 illustrating techniques for safe, low cost web services software deployments, according to one embodiment. As shown, the server 102 in web services cluster 101 hosts a single virtual machine, namely virtual machine 130, which runs services 111, 112. The virtual machines 110 and 120 have safely been removed from the server 102, eliminating costs associated with running additional virtual machines. The virtual machine 130 was used during an initial deployment of the co-located services 111, 112, which also served as a test period to determine that the services 111, 112 can execute on the same virtual machine without causing errors. Once the web services cluster 101 is consolidated, the cost in virtual machines is the same as if the services 111-112 had been co-located from the start. Consolidation improves a distribution for virtual machines in the web services cluster 101 allowing each service to function, while reducing the number of virtual machines required to provide the suite of services. Moreover, the consolidation may be achieved automatically, such as by configuring the agent to execute on predefined intervals (such as daily, weekly, etc), to identify candidates for co-location, and then perform the consolidation.

Figure 2:
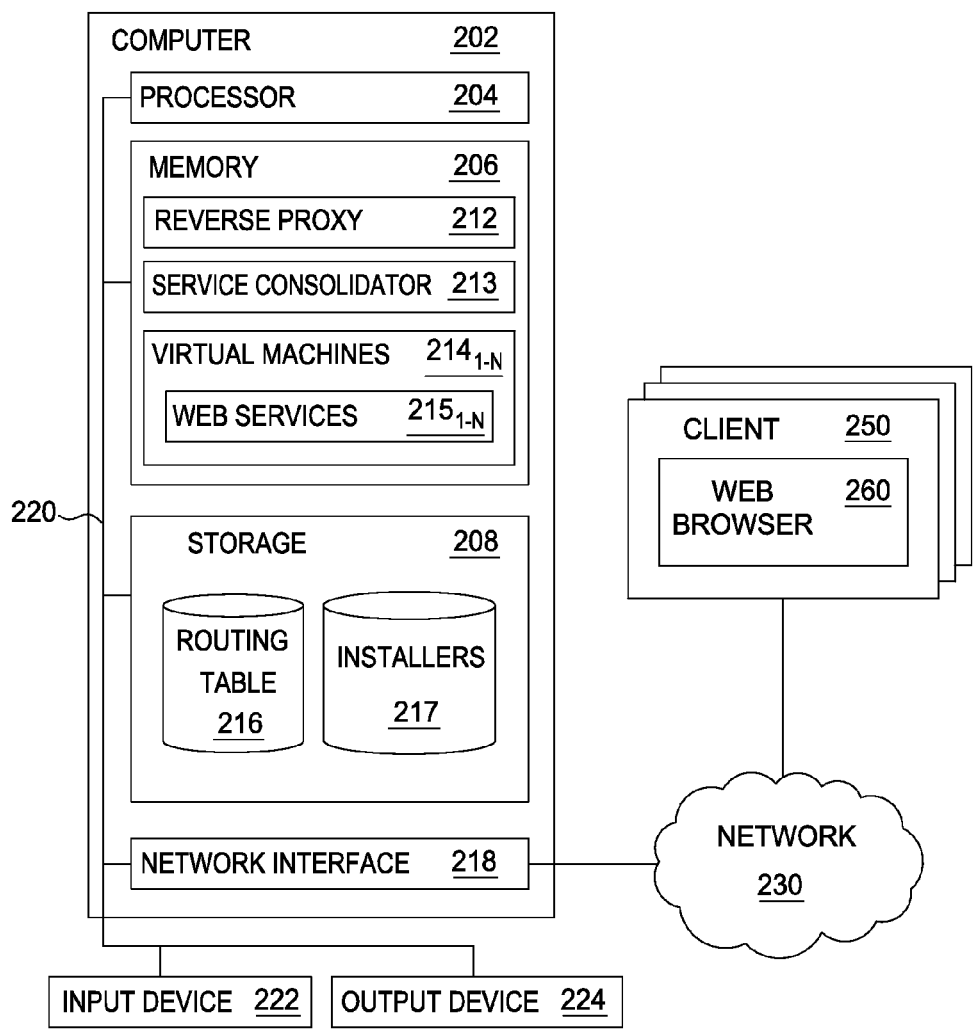
FIG. 2 illustrates a system for safe, low cost web services software deployments, according to one embodiment.

FIG. 2 illustrates a web services cluster 200 for safe, low cost web services software deployments, according to one embodiment. As shown, the web services cluster 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. The processor 204 is included to be representative of a single CPU, multiple CPUs, a single CPU having multiple processing cores, and the like. Similarly, the memory 106 may be a random access memory. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, floppy disc drives, SAN systems, NAS systems, memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains a plurality of virtual machines $214_{1-N}$, each of which may host one or more web services $215_{1-N}$. The web services $215_{1-N}$ may be any web service application. For example, web service $215_1$ is a voting application, and web service $215_2$ is an administration platform for the voting application. The memory 206 also contains a reverse proxy application 212, which is an application generally configured to fulfill requests for web services received from a web browser 260 on a computer 250 by selecting a stack (from the routing table 216) identifying a web service $215_{1-N}$ executing in the web services cluster 200. Using a reverse proxy application defining stacks for different web services is described in greater detail in U.S. patent application Ser. No. 13/833,387, filed Mar. 15, 2013, which is incorporated herein by reference in its entirety. Although used as an example, embodiments disclosed herein contemplate systems that do not use a reverse proxy application to fulfill requests for web services. Use of the reverse proxy application 212 should not be considered limiting of the disclosure.

As shown, the memory 206 also includes a service consolidator 213. The service consolidator 213 is an application generally configured to consolidate the web services cluster 200 by co-locating (or consolidating) two or more web services $215_{1-N}$ into one or more virtual machines. For example, if web service $215_1$ executes on virtual machine $215_1$, while web service $215_2$ executes on virtual machine $215_2$, the service consolidator 213 may co-locate web services $215_{1-2}$ on a single virtual machine $214_3$, and remove virtual machines $214_{1-2}$ from the web services cluster 200. In other embodiments, the web services $215_{1-N}$ may execute in the memory 206 without requiring a virtual machine $214_{1-N}$. In such an embodiment, one or more of a plurality of computers 202 may execute isolated services, and the service consolidator 213 may consolidate the web services cluster 200 by moving one or more isolated services to the same physical machine. Generally, embodiments disclosed herein contemplate consolidating the web services cluster 200 where the web services $215_{1-N}$ are deployed in any combination of physical or virtual machines.

As shown, the storage 208 includes a routing table 216, which stores information used to direct requests from the client computers 250 to an appropriate computer 202 (or virtual machine $214_{1-N}$) hosting the web service $215_{1-N}$. In one embodiment, the routing table 216 stores a plurality of stacks. Each stack has a name and weight and provides a mapping that translates web services $215_{1-N}$ names into corresponding service versions. A first stack S1 in the routing table 216 may specify a mapping of the voting service with voting 1.2.3, and a voting_admin service with voting_admin 2.4.5, and specify the appropriate destination computer 202 or virtual machine hosting the services. A second stack S2 may specify a mapping of voting with voting 1.2.4 and voting_admin voting_admin 2.4.6, and specify the appropriate destination computer 202 or virtual machine hosting the services. If stack S1 is employed, then calls to voting and voting_admin are mapped by the reverse proxy 212 to versions 1.2.3 and 2.4.5, respectively. Likewise, if stack S2 is employed, calls to voting and voting_admin are mapped by the reverse proxy 112 to versions 1.2.4 and 2.4.6, respectively. Each stack in the routing table may be assigned a specific weight. For example, stack S1 may have a weight such that it receives 95% of the traffic flow for testing purposes, whereas stack S2 may have a weight such that it receives 5% of the traffic flow.

As shown, the storage 208 also includes an installer repository 217. The installer repository 217 is generally a data structure sufficient to store installers (or references to installers) for the web services $215_{1-N}$. In one embodiment, the installer repository 217 generally specify a name and a version of the installer and any additional information required to launch a fresh copy of the service. In one embodiment, a name and version of the web service $215_{1-N}$ is used to identify the appropriate installer in the installer repository 217. While a variety of available tools may be used, in one embodiment, the installers in the installer repository 217 are Ruby Gems, where the installer for the voting-1.2.3 web service may be named voting-1.2.3.gem. Although depicted as databases, any data structure sufficient to hold routing information and installer information may be used to implement the routing table 216 and the installers 217. Additionally, the method 300 may be executed in a loop to consolidate the cluster in multiple iterations if there are sufficient numbers of isolated web services that may be co-located together in subsequent iterations.

Figure 3:
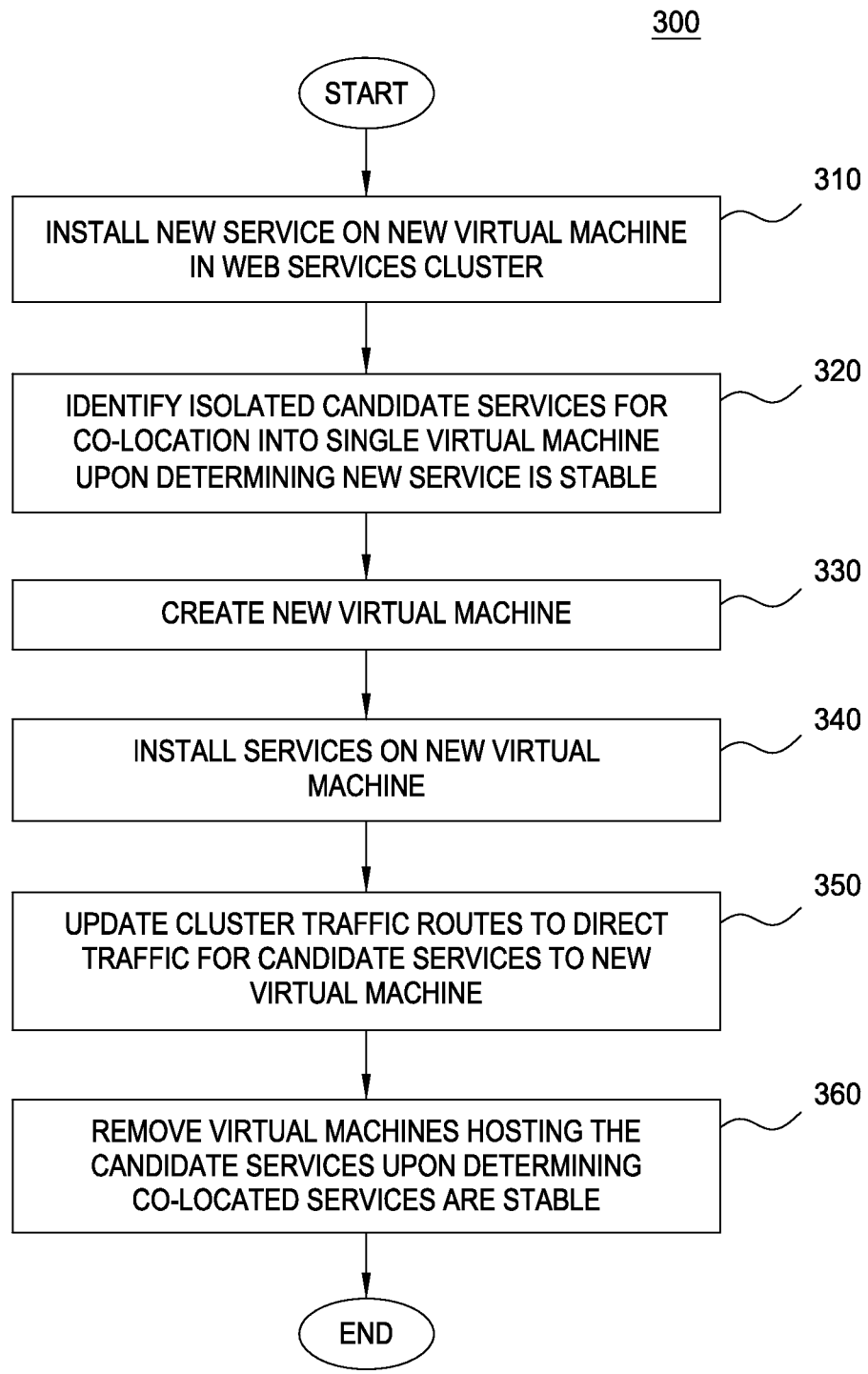
FIG. 3 illustrates a method for safe, low cost web services software deployments, according to one embodiment.

FIG. 3 illustrates a method 300 for safe, low cost web services software deployments, according to one embodiment. Generally, the steps of the method 300 consolidate a web services cluster by reducing the number of machines required to host the web services, while ensuring that the web services are stable and compatible with each other. The web cluster may include any number or combination of physical and virtual machines. The service consolidator 213 may execute method 300 in response to user commands, i.e., on demand. Alternatively, the service consolidator 213 may execute according to a predefined schedule. For example, the service consolidator 213 may be scheduled to execute at a specific time nightly, weekly, or monthly, or during off-peak hours, or other schedule as appropriate in a given case.

At step 310, the service consolidator 213 may install a new service on a new virtual machine in the web services cluster. In one embodiment, the new service is a new version of an existing service that has been deployed in the web services cluster. Generally, any type of service may be installed at step 310. At step 320, upon determining that the new service deployed on the new virtual machine in step 310 is stable, the service consolidator 213 may identify a candidate service to co-locate on a single virtual machine with the new service deployed at step 310. For example, the service consolidator 213 may select version 1.2.3 of a voting service, and version 2.3.4 of an achievements service. The candidate services may be identified based on a variety of criteria, such as an amount of resources (memory, CPU, etc) required by the services, whether the services are isolated (alone on the virtual machine), and how long the service has been executing on the virtual machine.

At step 330, the service consolidator 213 again creates and deploys a new virtual machine in the web services cluster. At step 340, the service consolidator 213 co-locates the services by installing the identified candidate service and the new service on the virtual machine created at step 330. In one embodiment, the service consolidator 213 installs the services on the new virtual machine by identifying the service names and versions, retrieving the corresponding installer (or install package) from the installer repository 217, and executing the installers to install the candidate services on the new virtual machine. The service consolidator 213 may identify the service names and versions by querying the virtual machines to determine what services they are running. In one embodiment, the name and version correspond to the installer name in the installers 217. For example, using the Ruby Gems convention of <servicename>-<version>.gem, the service consolidator 213 may retrieve voting-1.2.3.gem and achievements-2.3.4.gem from the installers 217. Once the service consolidator 213 has the appropriate installer packages, it may install the services to the new virtual machine.

At step 350, the service consolidator 213 may update the web cluster traffic routes to direct traffic for the candidate services to the new virtual machine. Any suitable technique may be used to update the traffic routes in the web services cluster, which may depend on the particular routing implementation therein. For example, assuming the web services cluster implements a reverse proxy, a stack may be defined to direct 100% of the traffic for voting and achievements to the new virtual machine, while directing no traffic to the isolated services running on individual virtual machines. Any percentage may be allocated to each stack, and the particular weights used herein are exemplary. For example, 95% of the traffic may be directed to the new virtual machine hosting both voting and achievements, and 5% to the isolated services running on their own virtual machines. At step 360, the service consolidator 213 may retire the virtual machine hosting the isolated candidate services upon determining that the co-located services installed on the same virtual machine at step 340 are stable. The service consolidator 213 may wait for a predefined period of time to elapse before removing the virtual machines, as it may be advantageous to confirm coexistence of the two services does not produce undesired results with such a "burn-in" period. Once the service consolidator 213 removes the virtual machines hosting the isolated web services, the new virtual machine remains, executing the co-located services, thereby saving the costs of additional virtual machines, while ensuring that the services may coexist on the same virtual machine.

Advantageously, embodiments disclosed herein provide techniques to consolidate web services clusters, while ensuring that software errors do not arise across instances of services due to misbehaving services or conflicts between the services. The consolidation may be scheduled to run on periodic intervals, removing the need for user input to drive the consolidation. When isolated services are identified (a single service executing on a single machine, physical or virtual), two or more of these services may be installed on a newly created virtual machine. Once a predefined "burn-in" period elapses, the virtual (or physical) machines hosting the isolated web services may be removed from the web services cluster in order to save costs.

Reference has been made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications for cluster consolidating or related data available in the cloud. For example, the cluster consolidating application could execute on a computing system in the cloud and consolidate different web services into one or more virtual machines. In such a case, the cluster consolidating application could consolidate the web services and deploy the one or more virtual machines in the cloud. Doing so allows a user to access these web services from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    installing a first service on a first virtual machine and a second service on a second virtual machine, the virtual machines configured to execute one or more services in a web services cluster;
    testing the first service on the first virtual machine and the second service on the second virtual machine to determine that the first and second services are stable;
    installing the first service and the second service on a third virtual machine configured to execute one or more services in the web services cluster;
    updating a routing table by: (i) increasing a weight applied to a first stack defined in the routing table to cause at least a portion of traffic directed to the first service on the first virtual machine and the second service on the second virtual machine to be sent to the first service and the second service executing on the third virtual machine, wherein the first stack is associated with the first and second services executing on the third virtual machine, and (ii) decreasing a weight applied to a second stack defined in the routing table, wherein the second stack is associated with the first service executing on the first virtual machine;
    testing the first service and the second service on the third virtual machine to determine whether the first service and the second service are stable when co-located on the third virtual machine; and
    removing the first and second virtual machines from the web services cluster upon determining that the first service and the second service executing on the third virtual machine are stable.

2. The method of claim 1, wherein the method is performed by a program composed according to a predefined language, wherein the program is scheduled to execute according to a predefined schedule.

3. The method of claim 1, wherein installing the first service and the second service on the third virtual machine comprises:
    identifying a respective name of the first service and the second service;
    identifying, based on the respective names, a respective installer for the first service and the second service; and
    executing the respective installers to install the first service and the second service on the third virtual machine.

4. The method of claim 1, wherein decreasing the weight applied to the second stack causes a reverse proxy to reduce the amount of traffic sent to the first virtual machine responsive to receiving requests targeting the first service, wherein updating the routing table further comprises:
    decreasing a weight applied to a third stack defined in the routing table, wherein the third stack is associated with the second service executing on the second virtual machine, wherein decreasing the weight applied to the third stack causes the reverse proxy to reduce the amount of traffic sent to the second virtual machine responsive to receiving requests targeting the second service,
    wherein increasing the weight applied to the third stack causes the reverse proxy to increase the amount of traffic sent to the third virtual machine generated by requests targeting the first and second services.

5. The method of claim 1, wherein testing the first service on the first virtual machine and testing the second service on the second virtual machine comprises testing the services in isolation on the respective virtual machine for a predefined period of time to determine the services are stable.

6. The method of claim 1, wherein testing the first service and the second service on the third virtual machine comprises testing the compatibility of the first service and the second service on the third virtual machine for a predefined period of time, wherein the first and third second machines are not removed until the first service and the second service are determined to be compatible for the predefined period of time.

7. The method of claim 1, wherein the first service and the second service are distinct services.

8. A system, comprising:
one or more computer processors; and
a memory containing a program which when executed by the one or more computer processors, performs an operation, the operation comprising:
installing a first service on a first virtual machine and a second service on a second virtual machine, the virtual machines configured to execute one or more services in a web services cluster;
testing the first service on the first virtual machine and the second service on the second virtual machine to determine that the first and second services are stable;
installing the first service and the second service on a third virtual machine configured to execute one or more services in the web services cluster;
updating a routing table by: (i) increasing a weight applied to a first stack defined in the routing table to cause at least a portion of traffic directed to the first service on the first virtual machine and the second service on the second virtual machine to be sent to the first service and the second service executing on the third virtual machine, wherein the first stack is associated with the first and second services executing on the third virtual machine, and (ii) decreasing a weight applied to a second stack defined in the routing table, wherein the second stack is associated with the first service executing on the first virtual machine;
testing the first service and the second service on the third virtual machine to determine whether the first service and the second service are stable when co-located on the third virtual machine; and
removing the first and second virtual machines from the web services cluster upon determining that the first service and the second service executing on the third virtual machine are stable.

9. The system of claim 8, wherein the program is scheduled to execute according to a predefined schedule.

10. The system of claim 8, wherein installing the first service and the second service on the third virtual machine comprises:
identifying a respective name of the first service and the second service;
identifying, based on the respective names, a respective installer for the first service and the second service; and
executing the respective installers to install the first service and the second service on the third virtual machine.

11. The system of claim 8, wherein decreasing the weight applied to the second stack causes a reverse proxy to reduce the amount of traffic sent to the first virtual machine responsive to receiving requests targeting the first service, wherein updating the routing table further comprises:
decreasing a weight applied to a third stack defined in the routing table, wherein the third stack is associated with the second service executing on the second virtual machine, wherein decreasing the weight applied to the third stack causes the reverse proxy to reduce the amount of traffic sent to the second virtual machine responsive to receiving requests targeting the second service,
wherein increasing the weight applied to the third stack causes the reverse proxy to increase the amount of traffic sent to the third virtual machine generated by requests targeting the first and second services.

12. The system of claim 8, wherein testing the first service on the first virtual machine and testing the second service on the second virtual machine comprises testing the services in isolation on the respective virtual machine for a predefined period of time to determine the services are stable.

13. The system of claim 8, wherein testing the first service and the second service on the third virtual machine comprises testing the compatibility of the first service and the second service on the third virtual machine for a predefined period of time, wherein the first and third second machines are not removed until the first service and the second service are determined to be compatible for the predefined period of time.

14. The system of claim 8, wherein the first service and the second service are distinct services.

15. A computer program product, comprising:
a non-transitory computer-readable storage medium having computer-readable program code embodied therewith, the computer-readable program code executable to perform an operation comprising:
installing a first service on a first virtual machine and a second service on a second virtual machine, the virtual machines configured to execute one or more services in a web services cluster;
testing the first service on the first virtual machine and the second service on the second virtual machine to determine that the first and second services are stable;
installing the first service and the second service on a third virtual machine configured to execute one or more services in the web services cluster;
updating a routing table by: (i) increasing a weight applied to a first stack defined in the routing table to cause at least a portion of traffic directed to the first service on the first virtual machine and the second service on the second virtual machine to be sent to the first service and the second service executing on the third virtual machine, wherein the first stack is associated with the first and second services executing on the third virtual machine, and (ii) decreasing a weight applied to a second stack defined in the routing table, wherein the second stack is associated with the first service executing on the first virtual machine;
testing the first service and the second service on the third virtual machine to determine whether the first service and the second service are stable when co-located on the third virtual machine; and
removing the first and second virtual machines from the web services cluster upon determining that the first service and the second service executing on the third virtual machine are stable.

16. The computer program product of claim 15, wherein the computer-readable program code is scheduled to execute according to a predefined schedule.

17. The computer program product of claim 15, wherein installing the first service and the second service on the third virtual machine comprises:
identifying a respective name of the first service and the second service;
identifying, based on the respective names, a respective installer for the first service and the second service; and executing the respective installers to install the first service and the second service on the third virtual machine.

18. The computer program product of claim 15, wherein decreasing the weight applied to the second stack causes a reverse proxy to reduce the amount of traffic sent to the first virtual machine responsive to receiving requests targeting the first service, wherein updating the routing table further comprises:
- decreasing a weight applied to a third stack defined in the routing table, wherein the third stack is associated with the second service executing on the second virtual machine, wherein decreasing the weight applied to the third stack causes the reverse proxy to reduce the amount of traffic sent to the second virtual machine responsive to receiving requests targeting the second service,
- wherein increasing the weight applied to the third stack causes the reverse proxy to increase the amount of traffic sent to the third virtual machine generated by requests targeting the first and second services.

19. The computer program product of claim 15, wherein testing the first service on the first virtual machine and testing the second service on the second virtual machine comprises testing the services in isolation on the respective virtual machine for a predefined period of time to determine the services are stable.

20. The computer program product of claim 15, wherein testing the first service and the second service on the third virtual machine comprises testing the compatibility of the first service and the second service on the third virtual machine for a predefined period of time, wherein the first and third second machines are not removed until the first service and the second service are determined to be compatible for the predefined period of time.

21. The computer program product of claim 15, wherein the first service and the second service are distinct services.

* * * * *